Figures 1, 2, 3:
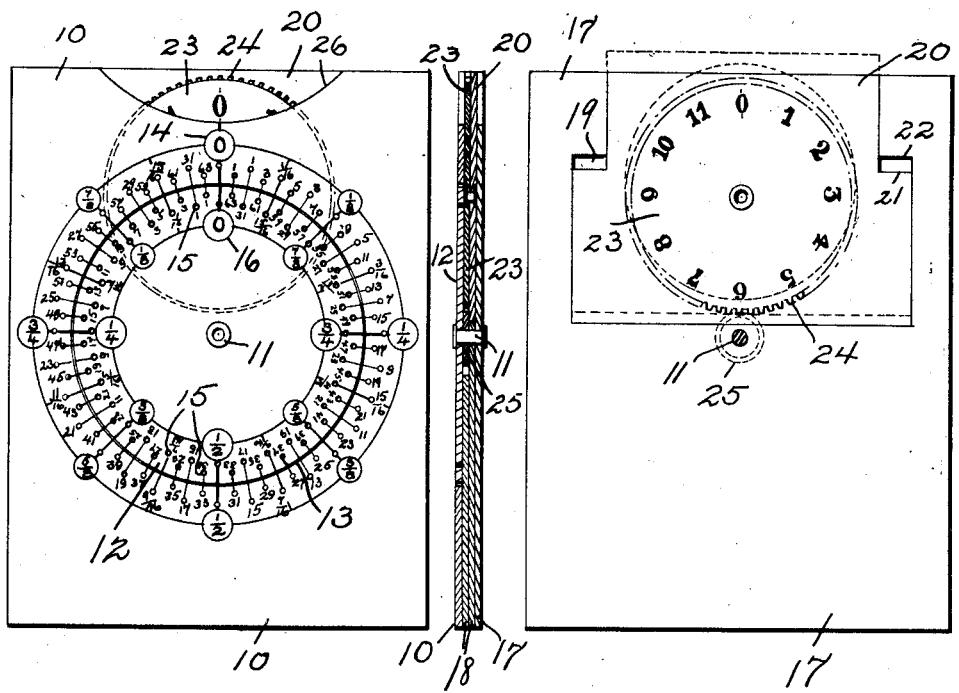

W. W. LEINERT.
CALCULATING DEVICE.
APPLICATION FILED OCT. 2, 1920.

1,435,485.

Patented Nov. 14, 1922.

INVENTOR
Wenzel W. Leinert
BY
Wm H. Campfield
ATTORNEY

Patented Nov. 14, 1922.

1,435,485

UNITED STATES PATENT OFFICE.

WENZEL W. LEINERT, OF NEW YORK, N. Y.

CALCULATING DEVICE.

Application filed October 2, 1920. Serial No. 414,251.

*To all whom it may concern:*

Be it known that I, WENZEL W. LEINERT, a citizen of Russia. and a resident of New York, county of New York, and State of New York, have invented certain new and useful Improvements in Calculating Devices, of which the following is a specification.

This invention relates to a calculating device which is adapted to be made of any desired size, but preferably of a small pocket size, and is particularly adapted for easy manipulation to permit the quick calculation in adding and subtracting numbers and fractions thereof.

The invention is designed to provide a device which can be easily re-set when a computation has been completed, so that the device indicates 0.

The invention is primarily designed to permit the addition of fractions, particularly the addition of fractions of inches, so that engineers, draftsmen and persons in similar lines can quickly add together fractions of number values without the necessity of written calculation.

The invention is illustrated in the accompanying drawing, in which Figure 1 is a face view of a structure embodying my invention. Figure 2 is a central vertical section through Figure 1, and Figure 3 is a section with the face plate and the rotatable scale of the device removed.

The invention comprises a front plate 10, which is a fixed scale, that is, it is not rotatable, and for the purpose of identification it is called a fixed scale and has pivoted thereon, as at 11, a rotatable scale 12, it being usual to cut out the fixed scale to permit the rotatable scale to be inserted therein so that a substantially flat exterior is provided. The scales are provided with graduations which are preferably arranged to indicate parts of an inch and are preferably arranged so that there are sixty-four sub-divisions, each representing one-sixty-fourth of an inch, since they are spaced equally apart at the edge of the opening 13 in the fixed scale 10, in which opening the rotatable scale can revolve.

A starting point is identified as at 14 and the sub-divisions of the more important fractions are emphasized, since it will be seen from the drawing that the sub-divisions of the eighths, quarters and one-half are made of a larger size and in similar sub-divisions. The graduations defining the sixty-fourths have the numeral value of the sixty-fourth applied only to the odd numbered fractions of this value, that is, 1, 3, 5, 7, etc., the intervening marks having identifications of thirty-seconds, as 1, 3, 5, 7, etc., these being also uneven. The sixteenths are identified as such, the value of these fractional indications increasing as the scale is rotated clockwise.

The rotatable scale 12 has its graduations, which are adapted to register with graduations on the fixed scale similarly numbered, but the values increase counter-clock-wise. The rotatable scale can be operated manually, preferably by means of a pencil point or any other sharp tool.

To permit such operation I place, adjacent to each graduation on the movable scale, a small recess or perforation 15. In order to clearly illustrate how the device is used it will be assumed that, in checking up, for instance, the measurements along a mechanical drawing, to secure the total length it is necessary to add fractions of many different values. For instance, if the draftsman is compelled to add one-eighth, nine-sixteenths, thirty-five sixty-fourths, seventeen - thirty - seconds, three-sixteenths and thirty-one sixty-fourths, he would first put his pencil point in the perforation at the 0 from the starting point indicated on the rotatable scale, and turn the rotatable scale until his pencil point came opposite one-eighth; then placing his pencil in that perforation in the rotatable scale that is directly under the identifying mark 14 on the fixed scale, he would then turn the device until his pencil point arrived opposite the graduations on the fixed scale marked nine-sixteenths. He would then place his pencil again in the perforation on the fixed scale that is directly under the starting mark on the fixed scale, turn the rotatable scale around clock-wise until his pencil arrived opposite the point marked thirty-five sixty-fourths, etc., and when the reading is to be done the 0 or starting mark indicated at 16 on the rotatable scale will be opposite the fractional element of the total on the fixed scale and indicates the fractional result.

A counter for registering the number of rotations or complete units will be utilized and will be described hereinafter.

The fixed or stationary scale is provided with a socket, which can be accomplished by placing a back plate 17 with a filling plate 18 on the back of the scale 10, the plates being pasted or otherwise secured together at their edges, these separate sheets being usually made of cardboard. In the socket 19, so formed, the slide 20 is placed and is held against complete withdrawl and is limited in its movement by reason of the shoulders 21 and 22 on the plate 18 and the slide 20, respectively. The slide has a rotatable counter 23 pivoted on its front face and the periphery of the counter is toothed, as at 24. The pinion 25 rotates with the rotatable scale 12 and the geared wheels are proportioned so that each complete rotation of the scale 12 brings the next number on the counter opposite the starting point 14. The stationary scale 10 is cut away, as at 26, so that the slide can be easily grasped by the fingers.

After a total has been reached, the slide 20 is pulled outwardly, which disengages the teeth 24 from the pinion 25. The counter and the rotatable scale are returned to indicate 0, the slide 20 is pushed in and the device is again ready for use.

Details of construction and the interval between the graduations of the scales can be altered without departing from the scope of the invention.

I claim:

1. A calculating device comprising a stationary scale having a socket formed thereunder, a slide in the socket having a counter thereon with a toothed periphery, a rotatable scale disposed so as to register on the stationary scale, and a pinion rotatable with the rotatable scale and adapted to be placed in mesh with the toothed periphery of the counter when the slide is moved inward in the socket, and separated from said counter when the slide is pulled outward in the socket.

2. A calculating device comprising a stationary scale having a socket formed thereunder, a slide in the socket having a counter thereon with a toothed periphery, a rotatable scale disposed so as to register on the stationary scale, a pinion rotatable with the rotatable scale and adapted to be placed in mesh with the toothed periphery of the counter when the slide is moved inward in the socket, and separated from said counter when the slide is pulled outward in the socket, and coacting means on the slide and on the stationary scale for limiting the outward movement of the slide.

In testimony that I claim the foregoing, I have hereto set my hand, this 30th day of September, 1920.

WENZEL W. LEINERT.